United States Patent [19]

Bell

[11] Patent Number: 4,893,231

[45] Date of Patent: Jan. 9, 1990

[54] MULTI-NODE DATA PROCESSING SYSTEM

[75] Inventor: Donald Bell, Disley, United Kingdom

[73] Assignee: International Computers Limited, London, England

[21] Appl. No.: 95,113

[22] Filed: Sep. 11, 1987

[30] Foreign Application Priority Data

Sep. 27, 1986 [UK] United Kingdom ............... 8623310

[51] Int. Cl.[4] .............................................. C06F 15/00
[52] U.S. Cl. ................................. 364/200; 340/825.05
[58] Field of Search ... 364/200 MS File, 900 MS File; 340/825.05; 370/94

[56] References Cited

U.S. PATENT DOCUMENTS

| 3,597,549 | 8/1971 | Farmer et al. | 325/53 |
|---|---|---|---|
| 3,732,543 | 5/1973 | Rocher et al. | 364/200 |
| 3,879,710 | 4/1975 | Maxemchuk et al. | 364/200 |
| 4,295,206 | 10/1981 | Cain et al. | 364/900 |
| 4,363,093 | 12/1982 | Davis et al. | 364/200 |
| 4,412,285 | 10/1983 | Neches et al. | 364/200 |
| 4,432,054 | 2/1984 | Okada et al. | 364/200 |
| 4,530,051 | 7/1985 | Johnson et al. | 364/200 |
| 4,543,630 | 9/1985 | Neches | 364/200 |
| 4,545,043 | 10/1985 | Anderson et al. | 364/900 |
| 4,653,048 | 3/1987 | Anderson et al. | 364/200 |

Primary Examiner—Gareth D. Shaw
Assistant Examiner—Debra A. Chun
Attorney, Agent, or Firm—Lee, Mann, Smith, McWilliams & Sweeney

[57] ABSTRACT

Multi-node data processing apparatus is described, in which the nodes are interconnected by multiple transmission links. Before a node can transmit a message, it must acquire a unique transmission sequence number (TSN) which it appends to the message when transmitted. Each node receives messages from all the links, and organizes them into strict TSN order before processing. This ensures that all the nodes process all the messages in the same sequence. The TSN may be acquired, for example, from a special ring interconnecting all the nodes.

3 Claims, 3 Drawing Sheets

MULTI-NODE DATA PROCESSING SYSTEM

This invention relates to multi-node data processing systems.

U.S. Pat No. 4,652,539 describes a data processing system comprising a plurality of processing nodes connected together by means of a data transmission link. Each node has its own data store which holds data items private to that node, and also holds copies of shared data items, common to all the nodes. Whenever a node updates one of the shared data items, it broadcasts an update message over the link to all the other nodes so that they can also update their copies of the data item. In this way, all the copies are kept consistent. To ensure the correct chronology of updating is maintained, it is necessary that each node receives all the update messages in the same sequence.

For high performance systems, a single data transmission link may be insufficient to handle all the messages between the nodes. It is therefore proposed to provide a plurality of transmission links between the nodes. However, a problem with this is that, in general, messages will no longer arrive at each node in the same sequence.

The object of the present invention is to overcome this problem.

SUMMARY OF THE INVENTION

According to the invention there is provided data processing apparatus comprising a plurality of data processing nodes, and a plurality of data transmission links for carrying messages between the nodes, characterised by means for allocating a unique transmission sequence number to each message, and characterised in that each node includes means for receiving messages from a plurality of the links and for organising those messages into order of their transmission sequence numbers.

BRIEF DESCRIPTION OF THE DRAWINGS

One data processing system in accordance with the invention will now be described by way of example with reference to the accompanying drawings.

DESCRIPTION OF AN EMBODIMENT OF THE INVENTION

Figure 1:
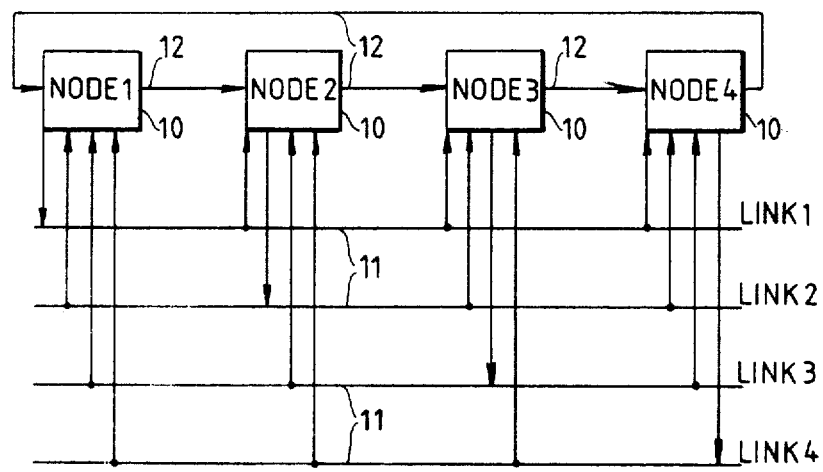
FIG. 1 is an overall block diagram of the system.

Referring to FIG. 1, this shows a multi-node data processing system comprising a plurality of processing nodes 10 (NODE 1-NODE 4), interconnected by four data transmission links 11 (LINK 1-LINK 4). Each node includes a data processing unit and local memory which are conventional in form and need not be described in this specification. Each node also contains circuits for controlling transmission of data messages over the links, as will be described below in detail.

Each of the data transmission links 11 may be a conventional broadcast bus. Alternatively, each may comprise a star coupler such as described for example in European Patent Specification No. 123507.

Each node 10 is allocated the sole transmission rights on one of the links. Thus, for example, only NODE 1 is allowed to transmit on LINK 1, and so on.

Each node can receive data messages from all the links, including the link for which it has transmission rights.

In addition to the above data links, the nodes are also connected together to form a closed ring 12. This ring carries no data, but carries a numerical value referred to as the transmission sequence number (TSN), which is used for controlling the transmission and reception of data messages on the data links 11, as follows.

When none of the nodes 10 wishes to transmit a message, the TSN is simply passed around the ring 11 from one node to the next without any alteration. When a node wishes to transmit a message, it waits until it receives the TSN. When the TSN is received, the node increments it by one and then passes it on the next node in the ring.

When the node has acquired a TSN in this way, it is allowed to transmit its message over its dedicated transmission link 11. The TSN is appended to the message as a header. Since only one node is allowed to transmit on each data link 11, no other access or contention resolution protocols are required for the links: each node can send its message over its link as soon as it has acquired a TSN.

All the nodes receive all messages transmitted on any of the links 11. Each node stores the messages received from each link in a separate queue along with their TSNs, and then reads out the message from all the queues in strict TSN order. Since each message transmitted over the links has a unique TSN, it can be seen that all the nodes will therefore read out the messages from the queues in the same sequence.

The TSN is transmitted around the ring 12 in serial form. Each TSN consists of eight bits, and is transmitted with the least significant bit first, and the most significant bit last. Each TSN is preceded by a marker bit of value "1" to indicate the start of the TSN, and between TSNs a series of zero bits is transmitted. The TSN on the ring 12 is encoded by means of a Manchester code.

Figure 2:
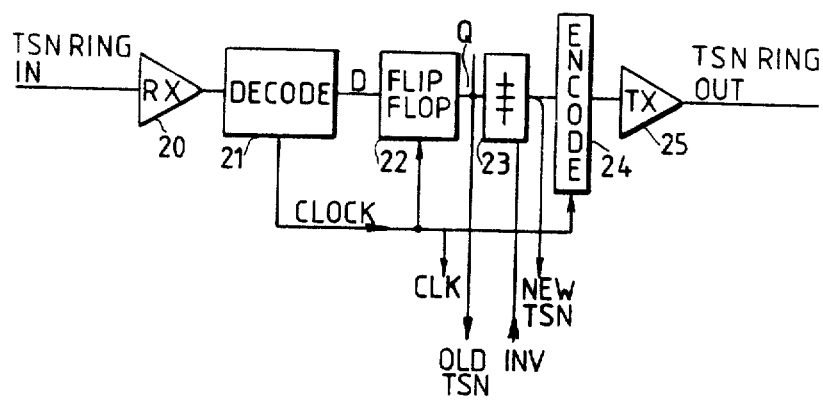
FIG. 2 shows a transaction sequence number (TSN) handling circuit in detail.

Referring now to FIG. 2, this shows a TSN handling circuit which is provided in each node, for passing the TSN around the ring and incrementing it when required.

The circuit comprises a receiver 20 which receives the incoming TSN from the preceding node in the ring 12 The output of the receiver 20 is fed to a decoder 21 which decodes the Manchester encoded signal to produce a clock signal CLK and a data signal D. The data signal is fed to a flip-flop 22, the output of which is fed to one input of an exclusive-OR gate 23. The output of the exclusive-OR gate is encoded by means of a Manchester encoder 24 and then fed to a transmitter 25 for transmission to the next node in the ring. Both the flip-flop 22 and the encoder 24 are clocked by the clock signal CLK.

The exclusive-OR gate 23 is controlled by a signal INV. Normally this signal is held at the value "0" so that the gate passes the data unaltered.

As described above, when the node has a message to transmit, it is required to increment the TSN by one. This is done by selectively pulsing INV to "1" so as to invert selected bits of the TSN according to the following algorithm:

(a) Invert the first (least significant) bit.

(b) Invert the next bit if it is "1" and if the previous bit was inverted.

(c) Repeat step (b) until all the TSN bits have been received.

It will be appreciated that this technique for incrementing the TSN can be applied to a number of any length, and that the incrementing is performed with only a single clock beat delay, introduced by the flip-flop 22.

The TSN handling circuit also supplies the following output signals for use as will be described later:
OLD TSN : the output of the flip-flop 22.
NEW TSN : the output of the exclusive-or gate.

Figure 3:
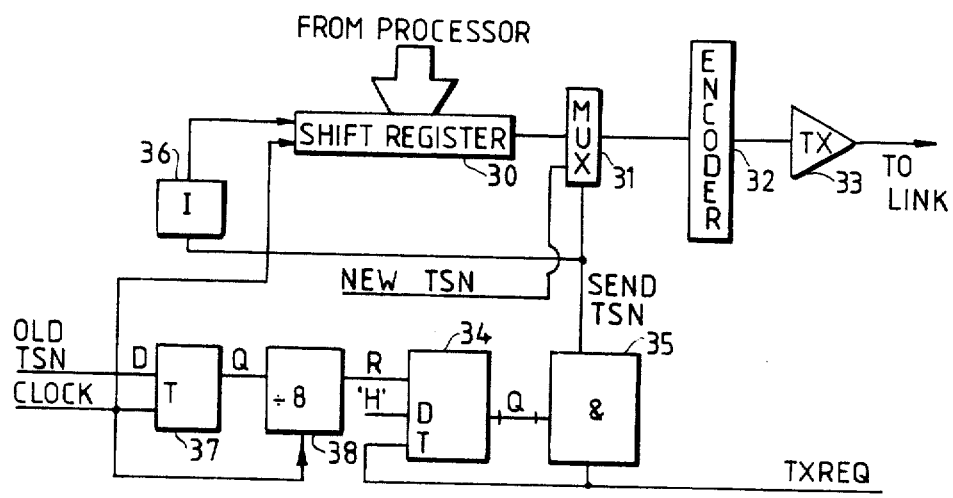
FIG. 3 shows a data transmission circuit in detail.

Referring now to FIG. 3, this shows a data transmission circuit which is provided in each node 10 for controlling the transmission of data on to the dedicated link 11 for that node.

Data to be transmitted is held in a shift register 30, and can be read out serially, by way of a multiplexer 31, a Manchester encoder 32, and a transmitter circuit 33, on to the link 11.

When the node has no message to send, the contents of the register 30 are set to zero and hence a succession of zero bits is transmitted over the link.

When the node has a message to send, it waits until no TSN is being received, i.e. until a stream of zeros is received over the TSN ring 12. It then produces a signal TxREQ and at the same time loads the message into the shift register 30.

TxREQ sets a flip-flop 34 and this enables an AND gate 35, producing a signal SENDTSN. This signal is inverted in a gate 36, which disables the shifting of the shift register 30. The signal SENDTSN also switches the multiplexer 31 to its other input so that it now selects the signal NEWTSN for output on to the link 11. At this stage, it is assumed that the TSN has not yet arrived and so NEWTSN is zero. Hence, zeros are still output on the link 11.

When the TSN arrives, it is incremented as described above. The incremented TSN is fed to the multiplexer 31 as NEWTSN, and is output on the data transmission link 11, with one clock beat delay (in the flip-flop 22 of FIG. 2).

The marker bit of the TSN sets a flip-flop 37, producing a START pulse. This triggers a divide-by-eight counter 38, which counts the next eight clock beats, corresponding to the eight bits of the TSN. At the end of the eight beats, the counter 38 produces a reset signal R which resets the flip-flop 34. This disables the AND gate 35, making SENDTSN false, which switches the multiplexer 31 back to its first input, so that it now selects the output of the shift register 30. The false value of SENDTSN also enables the shift register 30 to start shifting again, so that the contents of the shift register are now shifted out serially, for transmission over the link 11.

In summary, it can be seen that when the node has a message to transmit, it waits until it acquires a TSN. It then increments the TSN and outputs it on the link 11, followed by the message data.

As mentioned above, each node receives data from all four data transmission links 11.

Figure 4:
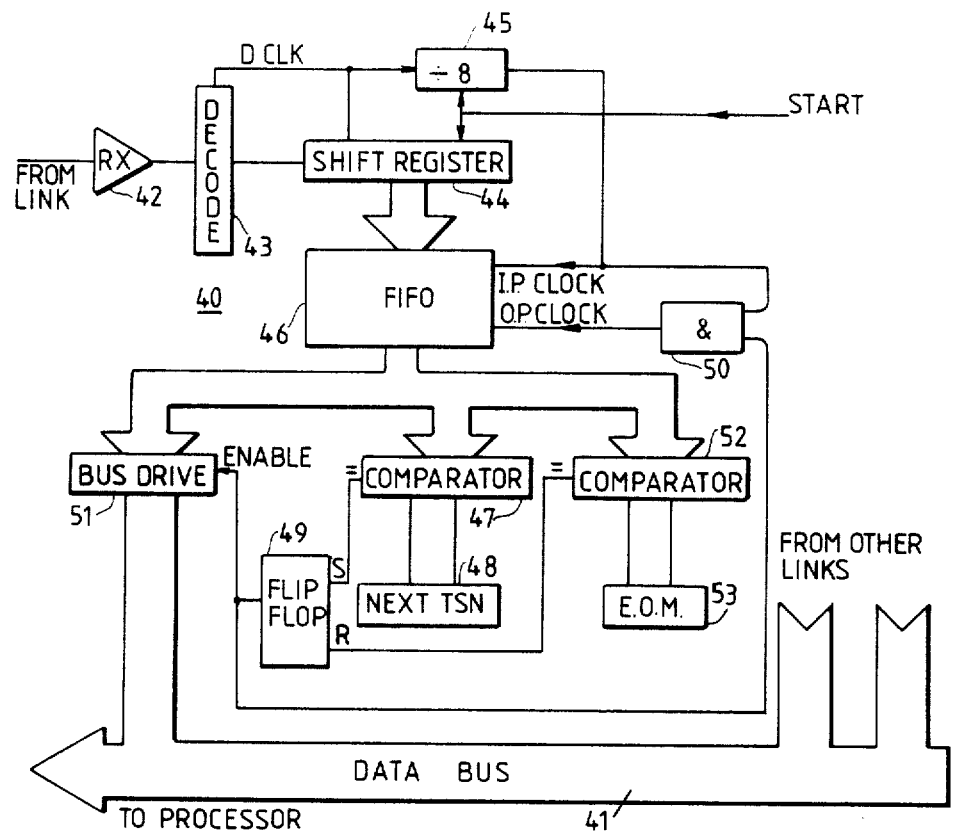
FIG. 4 shows a data reception circuit in detail.

Referring to FIG. 4, each node contains four data reception circuits 40 for receiving data from the respective links 11. Only one of these circuits is shown in FIG. 4; the other three are similar. The outputs of all the circuits 40 are connected to a data bus 41 which is fed to the data processing unit (not shown) of the node.

Input data from link 11 is fed by way of a receiver circuit 42 and a Manchester decoder 43 to the serial input of an eight-bit shift register 44. The decoder 43 also extracts a data clock signal DCLK from the data, and this is used as a shift clock for the register 44.

The clock DCLK is also fed to a divide-by-eight counter 45, to produce a clock signal IPCLK every eighth beat of DCLK. This causes the contents of the shift register 44 to be loaded in parallel into a first-in-first-out (FIFO) buffer 46. Thus, it can be seen that successive bytes of the incoming message, starting with the TSN attached to the message are loaded into successive locations of the FIFO buffer 46. The correct framing of byte boundaries is ensured by using the TSN start bit to synchronise the counter 45.

The TSN of the first (i.e. oldest) message in the FIFO buffer 46 is compared by means of a comparator 47 with the contents of a counter 48, which holds the value of the next expected TSN to be read out on to the data bus 41. If the comparator 47 detects equality, it sets a flip-flop 49, producing an ENABLE signal.

The ENABLE signal is combined in an AND gate 50 with the IP CLK signal, to produce an output clock signal OPCLK, which clocks data out of the FIFO buffer. The ENABLE signal also enables a bus drive circuit 51 which feeds each byte from the output of the FIFO buffer to the data bus 41.

The output of the FIFO buffer 46 is also compared, by means of a comparator 52, with a fixed pattern 53, representing the end-of-message byte EOM which forms the last byte of each message. When a match is detected, the flip-flop 49 is reset, removing the ENABLE signal. At the same time, the next TSN counter 48 is incremented.

It should be noted that the TSN counter 48, although shown as part of one data reception circuit 40, is actually shared between all four data reception circuits in the node, and is incremented if any one of the four circuits detects the end-of-message byte EOM.

Thus, in summary, it can be seen that messages from the four data transmission links are queued in the FIFO buffers of the respective data reception circuits They are then read out of the buffers on to the data bus 41 in strict TSN sequence, under control of the next TSN counter.

SOME POSSIBLE MODIFICATIONS

In the arrangement described above, TSNs are issued to the nodes by means of a ring connection. Alternatively, the TSNs may be issued by means of a special TSN issuing unit, connected to all the nodes in a star arrangement. Whenever a node wishes to send a message, it must first send a request to the TSN issuing unit, and then waits until it receives a TSN in response When a node has acquired a TSN in this way, it can send its message on one of the data links as before, with the TSN appended to the message. The TSN issuing unit is responsible for resolving contention between simultaneous requests from two or more nodes, and for incrementing the TSN.

In the basic arrangement described above, each node has a dedicated data transmission link for which it has the sole transmission rights It is also possible to provide each node with more than one dedicated link, to increase data handling capacity and o provide a form of graceful degradation in the event of errors. For example, each node may be provided with L links on which it has sole transmission rights, making a total of LN links, where N is the number of nodes.

A problem with this is that it requires a direct correlation between the number of nodes and the number of links, and this is not necessarily aligned to the overall data bandwidth requirements. Moreover, no node can acquire more bandwidth than is available on its own dedicated link or links, even if the other nodes are temporarily idle.

Alternatively, the dedicated links could be replaced by a set of shared links, each node being permitted to transmit on any one of the links. Each shared link may, for example, be a token star arrangement as described in the above-mentioned European Patent Specification. The number of links can then be chosen to handle the required overall data bandwidth, overcoming the problems referred to above In this case, transmission rights are still obtained by acquisition of a TSN either from a ring connection or from a special TSN issuing unit. Having acquired a TSN, a node is then allowed to transmit on the link whose token next arrives. All the nodes permanently listen to all the links, accepting messages into their FIFO buffers and processing them in strict TSN order as in the basic scheme.

In another possible modification, the dedicated links are again replaced by a set of shared links, and the right to transmit is again obtained by acquisition of a TSN. In this case, the L least significant bits of the TSN (where L is the number of links currently available or in use) are used to dictate on which link the transmission is to be made. This removes the need for any token or other contention resolution protocols, since only one node is allowed to transmit on each link at any given time.

As simply stated, this modification is only directly applicable to a fixed length messaging scheme in which the message transmission time is guaranteed to be less than the time when the incrementing/circulating TSN could re-allocate the transmission rights on a given link. However, this restriction could be avoided by adding a transmission link reservation/release mechanism to the TSN acquisition mechanism.

It should be noted that if dedicated transmission links are used, there is no reason why a node should not commence transmitting a message on a link for which it has sole transmission rights as soon as the message is ready for transmission, without waiting to acquire a TSN. When the TSN does become available, the node can then transmit that TSN following the message, rather than as a header to the message as in the system described above. In this case, it is necessary to ensure that each node does not commence processing any received message until the TSN for that message has arrived, and then only in strict TSN sequence.

I claim:

1. Data processing apparatus comprising:
   (a) a plurality of data processing nodes,
   (b) a plurality of data transmission links for carrying messages between the nodes, and
   (c) allocation means common to all the nodes, for allocating a single global sequence of transmission sequence numbers to messages transmitted by the nodes, each message being allocated a transmission sequence number unique to that message,
   (d) each node comprising means for reorganizing all of the message received from all the transmission links into order of their transmission sequence numbers.

2. Apparatus according to claim 1 wherein said means for organizing messages received from the transmission links into order of their transmission sequence numbers comprises:
   (a) a plurality of first-in-first-out buffers connected to receive messages from the transmission links into order of their transmission sequence numbers comprises:
   (b) a counter for holding an expected sequence number,
   (c) comparison means for comparing the expected sequence number held in the counter with the transmission sequence number held in each of said plurality of first-in-first-out buffers, and
   (d) means operative upon detection of a match by said comparison means for reading out a message from the first-in-first-out buffer holding the transmission sequence number that matches the expected sequence number.

3. Data processing apparatus comprising
   (a) a plurality of data processing nodes,
   (b) a plurality of data transmission links for carrying messages between the nodes,
   (c) a transmission path linking all the nodes together in a ring, and
   (d) means for circulating transmission sequence numbers around said transmission path, wherein each node comprises:
   (e) means for transmitting a message on one of said data transmission links,
   (f) means for acquiring a transmission sequence number from said transmission path for each transmitted message, the transmission sequence number being unique to the message, and for transmitting that number along with the message,
   (g) means for receiving messages from all said data transmission links, and
   (h) means for reorganizing all of the messages received from all the transmission links into order of their transmission sequence numbers.

* * * * *